US008690415B2

(12) United States Patent
Korherr et al.

(10) Patent No.: US 8,690,415 B2
(45) Date of Patent: Apr. 8, 2014

(54) OPTICAL DISPLAY ELEMENT COMPOSED OF SELECTIVELY ILLUMINABLE CONCENTRIC RINGS

(75) Inventors: Joachim Korherr, Orsingen (DE); Harald Koehnlein, Hilzingen (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 142 days.

(21) Appl. No.: 13/382,942

(22) PCT Filed: Jul. 15, 2010

(86) PCT No.: PCT/EP2010/004319
§ 371 (c)(1),
(2), (4) Date: Mar. 27, 2012

(87) PCT Pub. No.: WO2011/015278
PCT Pub. Date: Feb. 10, 2011

(65) Prior Publication Data
US 2013/0039089 A1  Feb. 14, 2013

(30) Foreign Application Priority Data

Aug. 5, 2009  (DE) .......................... 10 2009 036 211

(51) Int. Cl.
*G02B 6/00*  (2006.01)
(52) U.S. Cl.
USPC ........................... 362/616; 362/97.1; 362/615
(58) Field of Classification Search
USPC ........... 362/97.1, 97.2, 615, 616–617; 349/62
See application file for complete search history.

(56) References Cited

U.S. PATENT DOCUMENTS

| 6,675,650 | B1 | 1/2004 | Paulo | |
|---|---|---|---|---|
| 2003/0090886 | A1 | 5/2003 | Eckardt et al. | |
| 2009/0182202 | A1* | 7/2009 | Vayser et al. | 600/182 |
| 2009/0219730 | A1* | 9/2009 | Syfert et al. | 362/489 |

FOREIGN PATENT DOCUMENTS

| EP | 0684451 | 11/1995 |
|---|---|---|
| JP | 59-9602 | 1/1984 |
| JP | 61 3105 | 1/1986 |
| JP | 2003083776 | 3/2003 |
| JP | 2003139579 | 5/2003 |
| JP | 2004 93571 | 3/2004 |
| JP | 2005291786 | 10/2005 |
| JP | 2009-9926 | 1/2009 |
| JP | 2010117321 | 5/2010 |

* cited by examiner

*Primary Examiner* — Karabi Guharay
(74) *Attorney, Agent, or Firm* — Tarolli, Sundheim, Covell & Tummino LLP

(57) ABSTRACT

An optical display element (10) made up of selectively illuminatable concentric rings (14) is provided, in which the rings (14) are obtained by the light exit surface (20) of a respective optical waveguide body (18). Each optical waveguide body (18) has a light entry surface (22) which couples light in from an associated light source (24) which is adapted to be selectively activated. The light entry surface (22), as related to the common axis (12), has a larger radial extent than the light exit surface (20). Further, the optical waveguide bodies (18) have directly radially adjacent light-blocking side surfaces (30). Owing to this configuration, it is solely the optical waveguide bodies (18) which determine the geometry of the concentric rings (14). Since the optical waveguide bodies (18) can be manufactured with high precision, the intended close tolerances are obtained. In this way, radial distances between the rings (14) of only approximately 0.2 mm or less can be achieved.

9 Claims, 1 Drawing Sheet

OPTICAL DISPLAY ELEMENT COMPOSED OF SELECTIVELY ILLUMINABLE CONCENTRIC RINGS

RELATED APPLICATIONS

This application corresponds to PCT/EP2010/004319, filed Jul. 15, 2010, which claims the benefit of German Application No. 10 2009 036 211.8, filed Aug. 5, 2009, the subject matter, of which are incorporated herein by reference in their entirety.

BACKGROUND OF THE INVENTION

The present invention relates to an optical display element made up of selectively illuminatable concentric rings.

Such a display element is useful for an intuitively identifiable representation of analog variables which signal, e.g., functional states in a vehicle. For a fine resolution, neighboring concentric rings are required to have a small radial distance from each other. When conventional techniques are applied, such as burning out from a layer of paint by means of a laser or printing on and using optical waveguides located underneath for illuminating the individual rings, it is, however, not possible to reduce the radial distance to below about 0.4 mm, due to the addition of various tolerances.

SUMMARY OF THE INVENTION

The invention provides an optical display element made up of selectively illuminatable concentric rings which allows radial distances of only about 0.2 mm or less to be realized. In the optical display element according to the invention, the concentric rings are obtained by the light exit surface of a respective optical waveguide body which has a light entry surface coupling light in from an associated light source adapted to be selectively activated, the light entry surface, as related to the common axis, having a larger radial extent than the light exit surface, and the optical waveguide bodies having directly radially adjacent light-blocking side surfaces. Owing to this configuration, it is solely the optical waveguide bodies which determine the geometry of the concentric rings. Since the optical waveguide bodies can be manufactured with high precision, the intended close tolerances are obtained.

Advantageous further developments are specified in the dependent claims.

BRIEF DESCRIPTION OF THE DRAWINGS

Further advantages and features of the invention will become apparent from the description below given with reference to the accompanying drawings, in which.

DESCRIPTION OF AN EXEMPLARY EMBODIMENT

Figure 1:
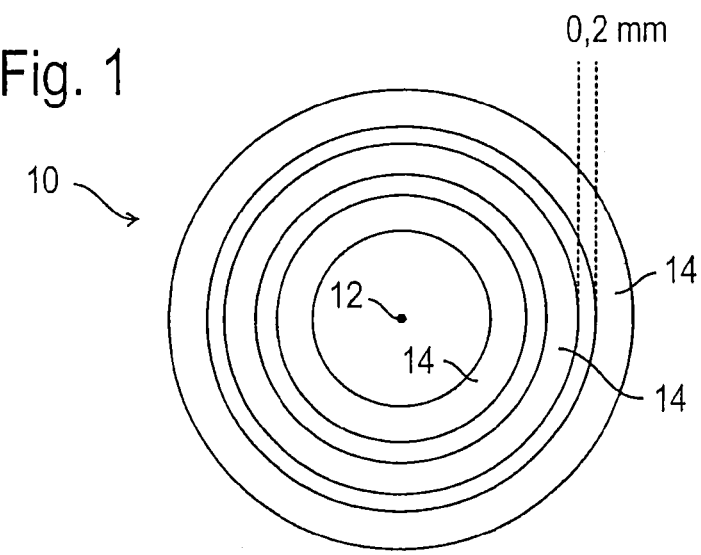
FIG. 1 shows an optical display element in a top view.

FIG. 1 shows an optical display element 10 made up of a plurality of selectively illuminatable rings 14 which are concentric about a common axis 12. A respective radial distance of 0.2 mm is provided between the illuminatable rings 14.

Figure 2:
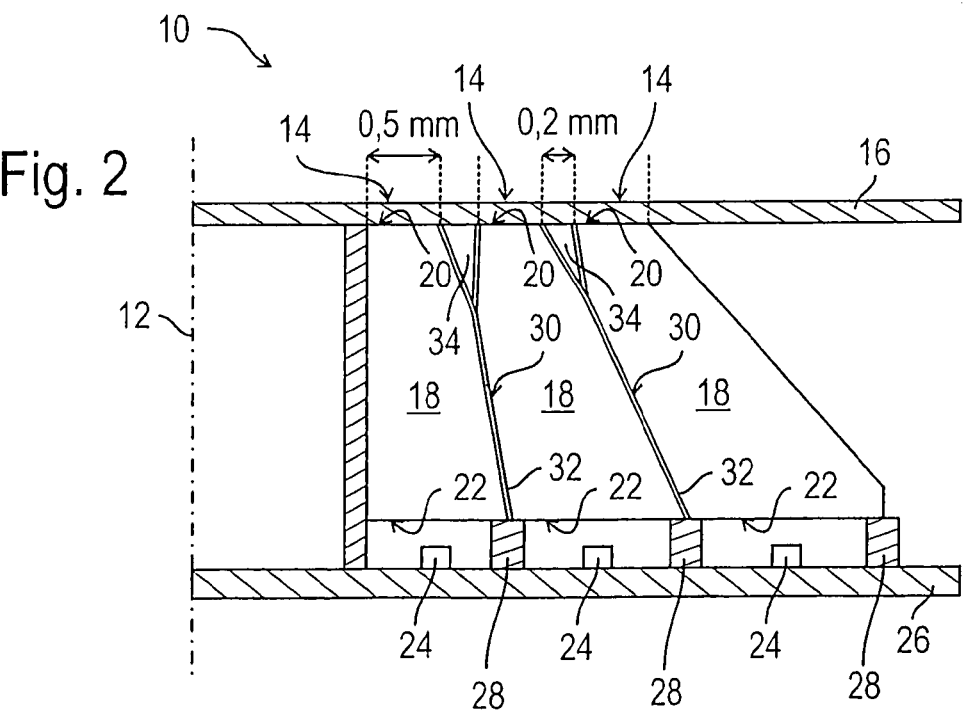
FIG. 2 shows the display element in a sectional view.

FIG. 2 shows a sectional view of the optical display element 10 along a radial cutting plane. The common axis 12 of the concentric illuminatable rings 14 is shown on the left-hand side of the drawing. An at least partly transparent film 16 forms the surface of the optical display element 10. Arranged under the film 16 is a plurality of concentric, annular optical waveguide bodies 18 which each include a light exit surface 20 facing the film 16 and producing the respective illuminatable ring 14, and a light entry surface 22 facing away from the film 16.

The light entry surface 22 of an optical waveguide body 18 couples light of an associated, selectively activatable light source 24 into the optical waveguide body 18. The light entry surfaces 22 of the various optical waveguide bodies 18 lie in a common plane and the light sources 24 are arranged on a printed circuit board 26 which is located opposite to and at a small distance from the light entry surfaces 22.

The optical waveguide bodies 18 are shielded by light barriers 28 against light from light sources 24 of neighboring optical waveguide bodies 18.

The light exit surfaces 20 couple the light of the light source 24 guided through the optical waveguide body 18 into the at least partly transparent film 16, as a result of which the associated ring 14 of the optical display element 10 is illuminated.

As related to the common axis 12, the light entry surfaces 22 of the optical waveguide bodies 18 have a larger radial extent than the light exit surfaces 20. The light exit surfaces 20 are connected with the light entry surfaces 22 by side surfaces 30 which are made to be light-blocking, for example by changes in the refractive index, generating total reflection, in the region of the side surfaces 30 or by a coating 32 of the side surfaces 30, in particular by physical vapor deposition or painting.

The side surfaces 30 of the optical waveguide bodies 18 diverge towards the light entry surfaces 22, the side surfaces 30 of optical waveguide bodies 18 located further outside diverging more strongly than those of optical waveguide bodies 18 located further inside.

The light-blocking side surfaces 30 of the optical waveguide bodies 18 are immediately adjacent to each other in the radial direction, as a result of which it is solely the optical waveguide bodies 18 which determine the geometry of the concentric rings 14. Since the optical waveguide bodies 18 can be manufactured with high precision, the intended close tolerances are obtained.

Adjacent to the light exit surfaces 20, a respective wedge-shaped gap 34 remains between neighboring side surfaces 30 which determines the radial distance of the illuminatable rings 14. Depending on the gap 34, the radial distance between neighboring illuminatable rings 14 may amount to between 0.1 and 0.3 mm.

The invention claimed is:

1. An optical display element (10) made up of a plurality of selectively illuminatable rings (14) which are concentric about a common axis (12) and are obtained by the light exit surface (20) of a respective optical waveguide body (18) which has a light entry surface (22) coupling light in from an associated light source (24) adapted to be selectively activated, the light entry surface (22), as related to the common axis (12), having a larger radial extent than the light exit surface (20), and the optical waveguide bodies (18) having directly radially adjacent light-blocking side surfaces (30).

2. The optical display element (10) according to claim 1, in which the light entry surfaces (22) of the optical waveguide bodies (18) lie in a common plane and the light sources (24) are arranged on a printed circuit board (26) which is located opposite to and at a small distance from the light entry surfaces (22).

3. The optical display element (10) according to claim 2, in which the optical waveguide bodies (18) are shielded by light barriers (28) against light from light sources (24) of neighboring optical waveguide bodies (18).

4. The optical display element (10) according to claim 1, in which the light exit surfaces (20) of the optical waveguide bodies (18) are connected to the light entry surfaces (22) by side surfaces (30) which diverge towards the light entry surfaces (22).

5. The optical display element (10) according to claim 4, in which the side surfaces (30) of optical waveguide bodies (18) located further outside diverge more strongly than those of optical waveguide bodies (18) located further inside.

6. The optical display element (10) according to claim 4, in which the side surfaces (30) of the optical waveguide bodies (18) lie directly adjacent to each other and, adjacent to the light exit surfaces (20), a respective wedge-shaped gap (34) remains between neighboring side surfaces (30) which determines the radial distance of the illuminatable rings (14).

7. The optical display element (10) according to claim 6, in which the radial distance between neighboring illuminatable rings (14) amounts to between 0.1 and 0.3 mm.

8. The optical display element (10) according to claim 7, in which the radial distance between neighboring illuminatable rings (14) amounts to approximately 0.2 mm.

9. The optical display element (10) according to claim 1, wherein the side surfaces (30) of the optical waveguide bodies (18) have a light-blocking coating (32).

\* \* \* \* \*